(12) United States Patent
Okamura

(10) Patent No.: US 12,000,427 B2
(45) Date of Patent: Jun. 4, 2024

(54) FALL PREVENTION TOOL

(71) Applicant: ADVANEX INC., Tokyo (JP)

(72) Inventor: Sakae Okamura, Kashiwazaki (JP)

(73) Assignee: ADVANEX INC., Tokyo (JP)

( * ) Notice: Subject to any disclaimer, the term of this patent is extended or adjusted under 35 U.S.C. 154(b) by 355 days.

(21) Appl. No.: 17/428,877

(22) PCT Filed: Feb. 6, 2020

(86) PCT No.: PCT/JP2020/004473
§ 371 (c)(1),
(2) Date: Aug. 5, 2021

(87) PCT Pub. No.: WO2020/162522
PCT Pub. Date: Aug. 13, 2020

(65) Prior Publication Data
US 2022/0106975 A1   Apr. 7, 2022

(30) Foreign Application Priority Data
Feb. 7, 2019  (JP) ................................. 2019-020673

(51) Int. Cl.
*F16B 39/20*   (2006.01)
(52) U.S. Cl.
CPC .................................... *F16B 39/20* (2013.01)
(58) Field of Classification Search
CPC .......... F16B 39/08; F16B 39/10; F16B 39/20; F16B 39/34; F16B 39/36; Y10S 411/928
USPC ................. 411/204, 246, 250, 252, 254–256
See application file for complete search history.

(56) References Cited

U.S. PATENT DOCUMENTS

| | | | | |
|---|---|---|---|---|
| 622,895 A * | 4/1899 | Kissinger | ................ | F16B 39/32 411/201 |
| 637,426 A * | 11/1899 | Sparr | ...................... | F16B 39/14 411/87 |
| 756,010 A * | 3/1904 | Fletcher | .................. | F16B 39/32 411/252 |
| 1,071,508 A * | 8/1913 | Cheneau | ................. | F16B 39/32 411/252 |
| 1,172,722 A | 2/1916 | Millard | | |
| 1,362,288 A * | 12/1920 | Glenn | ...................... | F16B 39/20 411/926 |

(Continued)

FOREIGN PATENT DOCUMENTS

| | | | |
|---|---|---|---|
| CN | 102235413 A | | 11/2011 |
| DE | 328000 C | | 10/1920 |

(Continued)

OTHER PUBLICATIONS

International Search Report, dated Mar. 24, 2020, for International Application No. PCT/JP2020/004473, 5 pages. (with English translation).

(Continued)

*Primary Examiner* — Roberta S Delisle
(74) *Attorney, Agent, or Firm* — Seed IP Law Group LLP

(57) ABSTRACT

Provided is a fall prevention tool (1) for a nut (N), which is installed in a bolt (B) to which the nut (N) is attached, the tool including a bolt holding part (2b) into which the bolt (B) is inserted, and a nut holding part (3) that is provided integrally with the bolt holding part (2b), is provided on an outer periphery of the nut (N), and is configured to prevent rotation of the nut (N) by restoring force.

12 Claims, 4 Drawing Sheets

(56) References Cited

U.S. PATENT DOCUMENTS

| | | | | |
|---|---|---|---|---|
| 1,366,273 | A | * | 1/1921 | Nettlefold ............... F16B 39/20 411/928 |
| 1,932,709 | A | * | 10/1933 | Rea .......................... F16B 39/20 411/929.1 |
| 2,562,621 | A | * | 7/1951 | Larson .................... F16B 39/32 99/421 V |
| 2,642,108 | A | * | 6/1953 | Geistert .................. F16B 39/20 411/130 |
| 5,207,543 | A | * | 5/1993 | Kirma ..................... F16B 39/08 411/206 |
| 8,845,254 | B2 | | 9/2014 | Lee |
| 2008/0260491 | A1 | | 10/2008 | Soeda et al. |

FOREIGN PATENT DOCUMENTS

| DE | 102004043078 A1 | 3/2006 |
|---|---|---|
| GB | 162361 A | 4/1921 |
| JP | S4914857 A | 2/1974 |
| JP | S5665220 U | 6/1981 |
| JP | S576818 U | 1/1982 |
| JP | 2009-052648 A | 3/2009 |
| JP | 2010-121708 A | 6/2010 |
| JP | 2011174600 A | 9/2011 |
| JP | 2012-037010 A | 2/2012 |
| JP | 5200190 B2 | 5/2013 |
| JP | 2016-156482 A | 9/2016 |
| JP | 2020-034092 A | 3/2020 |
| KR | 20070031377 A | 3/2007 |
| WO | 03/095850 A1 | 11/2003 |

OTHER PUBLICATIONS

Extended European Search Report, dated Sep. 16, 2022, for European Patent Application No. 20752912.4-1015. (7 pages).

* cited by examiner

FALL PREVENTION TOOL

TECHNICAL FIELD

The present invention relates to a fall prevention tool. Priority is claimed on Japanese Patent Application No. 2019-020673, filed on Feb. 7, 2019, the content of which is incorporated herein by reference.

BACKGROUND ART

In order to prevent a nut attached to a bolt from falling off, a fall prevention tool may be attached to the bolt. For example, Patent Document 1 discloses a fall prevention tool including an annular-shaped first coil spring part, a second coil spring part disposed on the first coil spring part and wound around a bolt, and a connection part that connects the first coil spring part and the second coil spring part to each other. The fall prevention tool can be attached to the bolt in the same manner as the nut. As a result, the fall prevention tool is wound around the bolt to prevent the movement of the nut in a bolt axis direction.

CITATION LIST

Patent Document

Patent Document 1
Japanese Patent No. 5200190

SUMMARY OF INVENTION

Technical Problem

In the fall prevention tool described above, since loosening of the nut is prevented by winding the fall prevention tool around the bolt, it is necessary to fix the fall prevention tool to the bolt with strong force. Therefore, for example, in a case in which the nut is detached from the bolt during maintenance or dismantling, the fall prevention tool bites into the nut, and thus it is difficult to detach the fall prevention tool from the bolt. Therefore, in a case of detaching the fall prevention tool in the related art, the fall prevention tool is detached by being destroyed with a tool or the like.

The present invention has been made in view of the above circumstances, and an object of the present invention is to facilitate the detachment of the fall prevention tool.

Solution to Problem

A first aspect of the present invention relates to a fall prevention tool for a nut, which is installed in a bolt to which the nut is attached, the tool including a bolt holding part into which the bolt is inserted, and a nut holding part that is provided integrally with the bolt holding part, is provided on an outer periphery of the nut, and is configured to prevent rotation of the nut by restoring force.

A second aspect of the present invention relates to the fall prevention tool according to the first aspect further including a handle part that is connected to the bolt holding part and is configured to change a diameter of the bolt holding part.

A third aspect of the present invention relates to the fall prevention tool according to the second aspect, in which the handle part protrudes outward with respect to the nut holding part in a radial direction of the bolt.

A fourth aspect of the present invention relates to the fall prevention tool according to any one of the first to third aspects, in which the bolt holding part and the nut holding part are formed by a single metal wire.

A fifth aspect of the present invention relates to the fall prevention tool according to any one of the first to fourth aspects, in which the nut holding part comes into contact with an outer peripheral surface of the nut and has a polygonal shape.

Advantageous Effects of Invention

According to the fall prevention tool according to the above aspects of the present invention, the nut holding part holds the nut to prevent the rotation of the nut by the restoring force. As a result, the nut can be prevented from falling off without applying large force to the bolt. Therefore, the fall prevention tool according to the above aspects of the present invention can be detached from the bolt without being destroyed and can be easily detached from the bolt.

DESCRIPTION OF EMBODIMENTS

Hereinafter, an embodiment of a fall prevention tool according to the present invention will be described with reference to the drawings.

Figure 1:
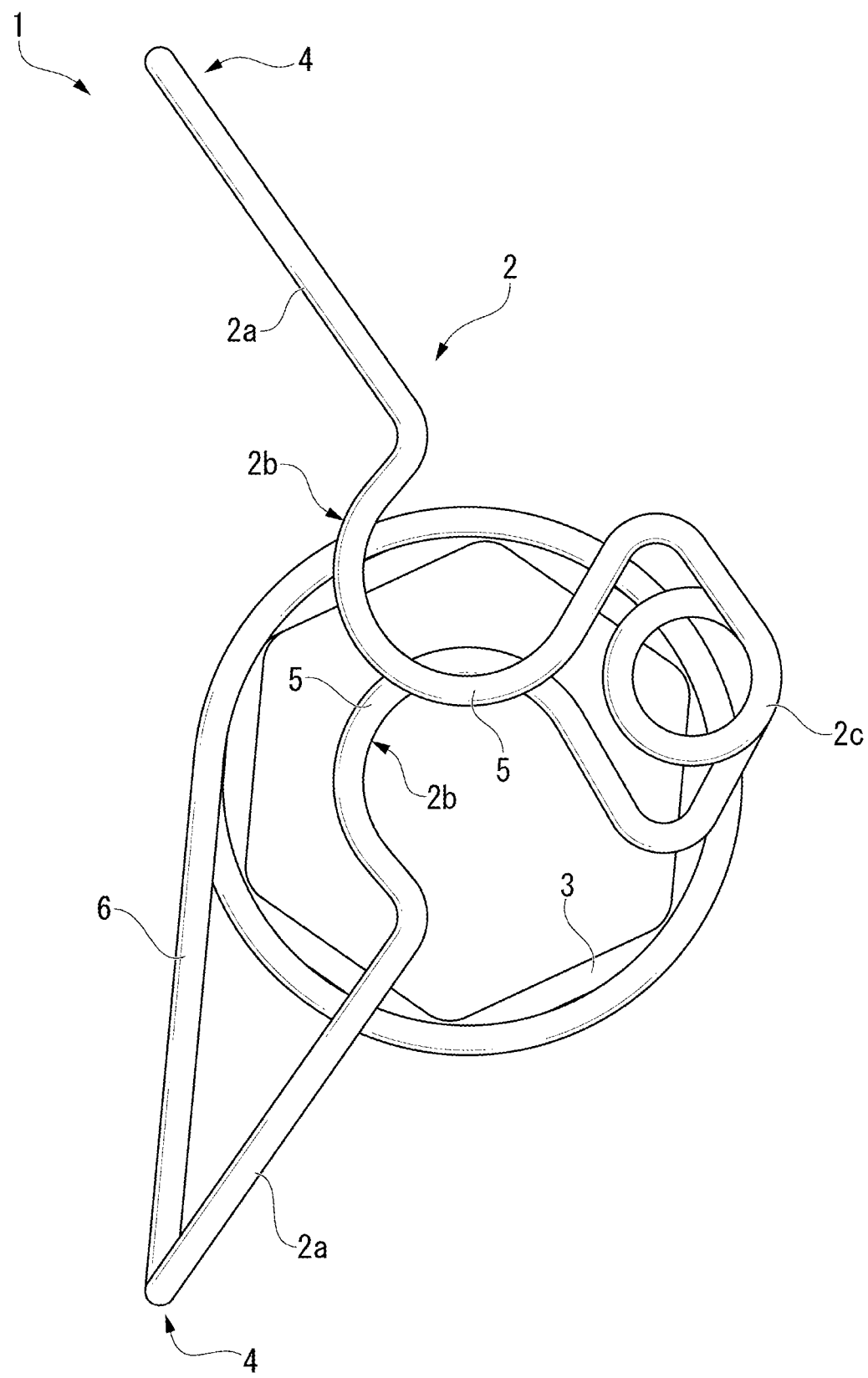
FIG. 1 is a front view of a fall prevention tool according to an embodiment of the present invention when being not attached to a bolt.
Figure 2:
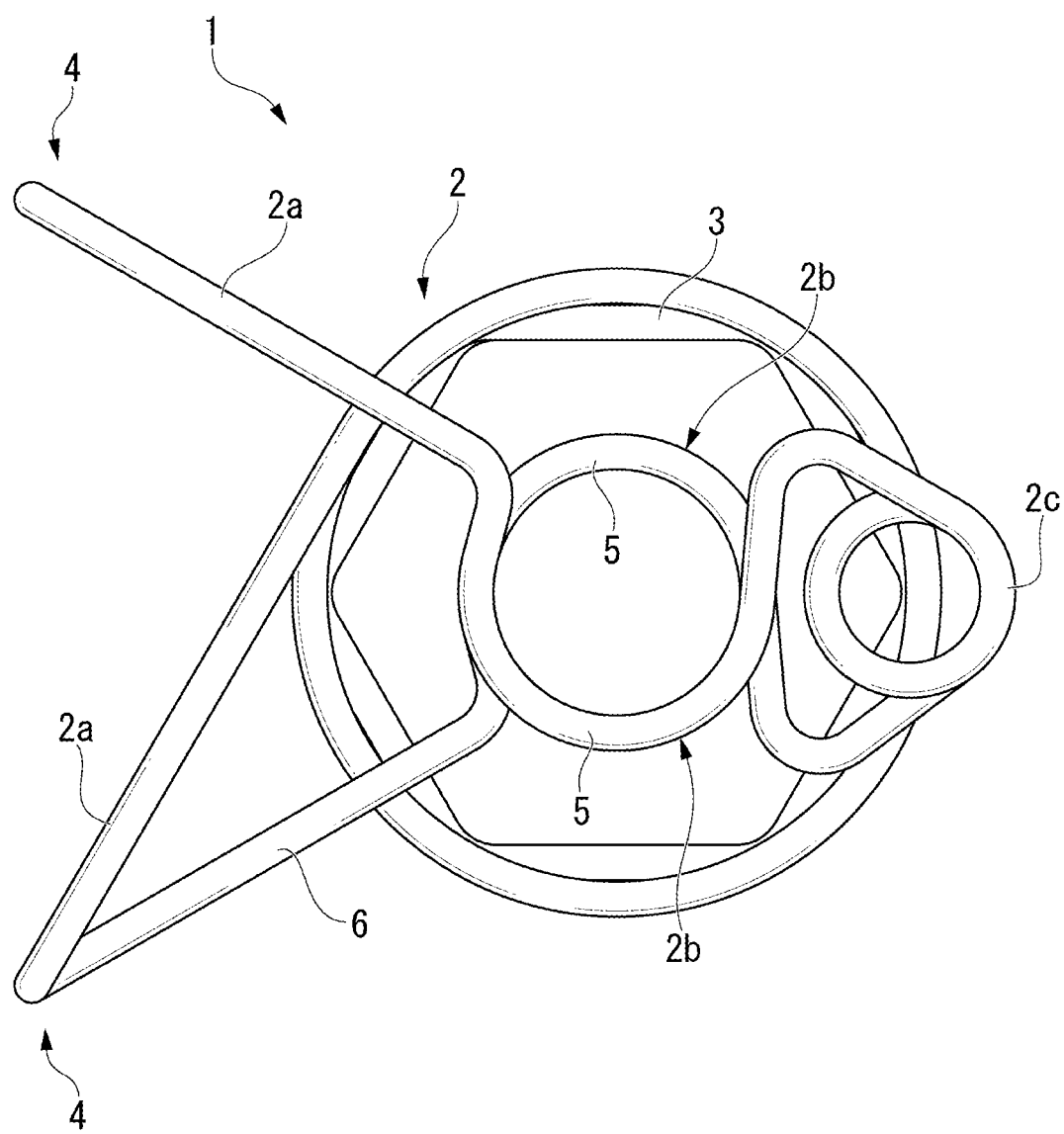
FIG. 2 is a front view of the fall prevention tool according to the embodiment of the present invention when being attached to the bolt.
Figure 3:
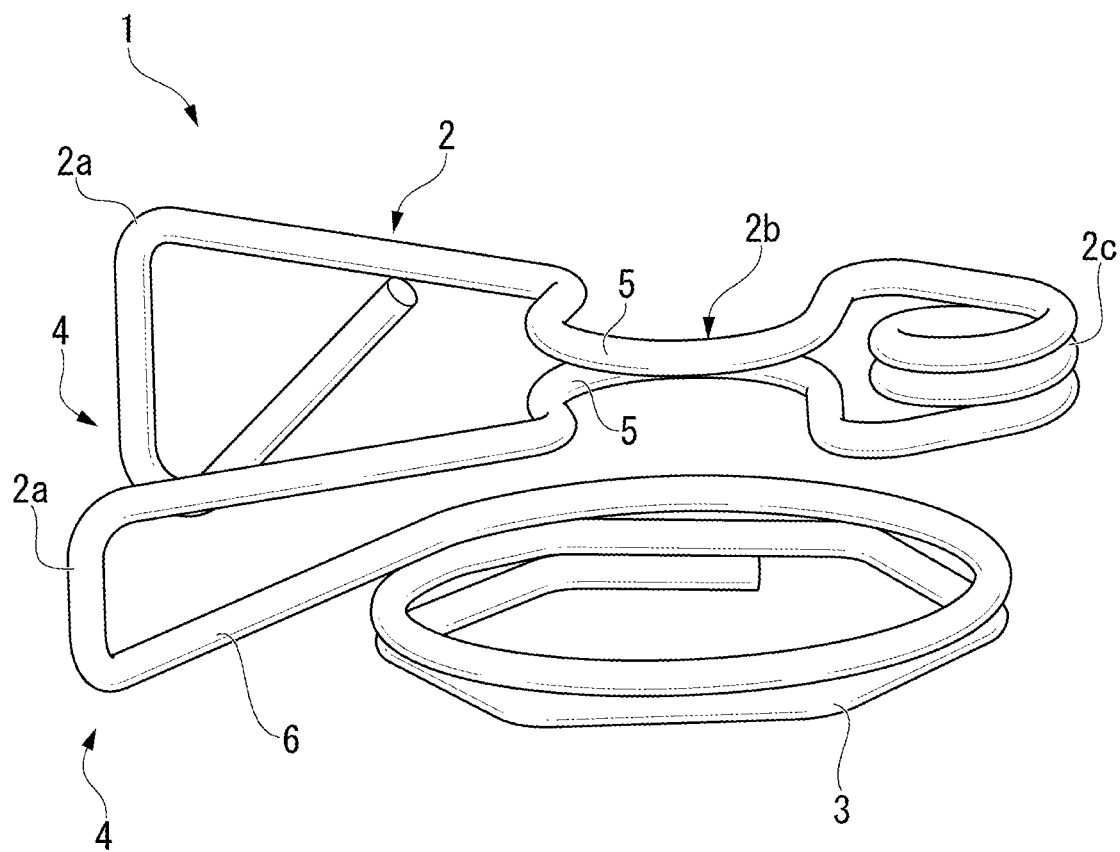
FIG. 3 is a perspective view of the fall prevention tool according to the embodiment of the present invention.

A fall prevention tool 1 according to the present embodiment is formed by bending a single metal wire 6 and has a movable part 2 and a nut holding part 3 as shown in FIGS. 1 to 3.

The movable part 2 includes a handle part 2a, a bolt holding part 2b, and a winding part 2c. The handle part 2a is comprised of two convex parts 4 bent in a V shape which are disposed so as to intersect each other. In addition, the two convex parts 4 of the handle part 2a are continuous via the bolt holding part 2b and the winding part 2c. As a result, the handle part 2a can change a width (distance in a direction perpendicular to a bolt axis direction) between curved parts 5 described below in the bolt holding part 2b provided continuously to change an inner diameter of the bolt holding part 2b. The handle part 2a protrudes outward with respect to the nut holding part 3 in a radial direction as viewed from the bolt axis direction. Here, the bolt axis direction refers to an extending direction of a bolt B shown in FIG. 4.

The bolt holding part 2b is formed continuously with an end part of the handle part 2a and has the two curved parts 5 curved in semicircular shapes. The two curved parts 5 are formed continuously with the two convex parts 4 respectively, and are overlapped with each other in the bolt axis direction by changing an intersection angle of the convex parts 4, such that the two curved parts 5 form an annular shape as viewed from the bolt axis direction. Then, the bolt B is inserted into a cavity in the center of the bolt holding part 2b, and the bolt B is held in a state of being meshed with a thread groove G. That is, the bolt holding part 2b interposes the bolt B between the two curved parts 5 to hold the bolt B.

The winding part 2c is a coil spring-shaped part formed by winding the metal wire 6 coaxially a plurality of times. Such a winding part 2c is formed adjacent (continuously) to the bolt holding part 2b on a side opposite to the handle part 2a, and both ends of the winding part 2c are continuous with the two curved parts 5. Then, in a case in which the force is applied to end parts of the handle part 2a, the winding part 2c is elastically deformed in a diameter-reducing direction, such that a position of the handle part 2a can be changed.

The nut holding part 3 is continuously formed with one end of the handle part 2a, is bent in a hexagonal shape (polygonal shape), and is wound a plurality of times as shown in FIG. 3. Such a nut holding part 3 is disposed coaxially with the bolt holding part 2b (curved part 5) which has the annular shape as viewed from the bolt axis direction by applying the force to the handle part 2a. As shown in FIG. 2, the nut holding part 3 is disposed on an outer periphery of a nut N in a case in which the fall prevention tool 1 is attached to the bolt B. In this case, an inside of the nut holding part 3 is fixed in a state of coming into contact with each surface of the outer periphery of the hexagonal-shaped nut N. That is, the nut holding part 3 is fixed in a state of coming into contact with an outer peripheral surface of the nut N.

Figure 4:
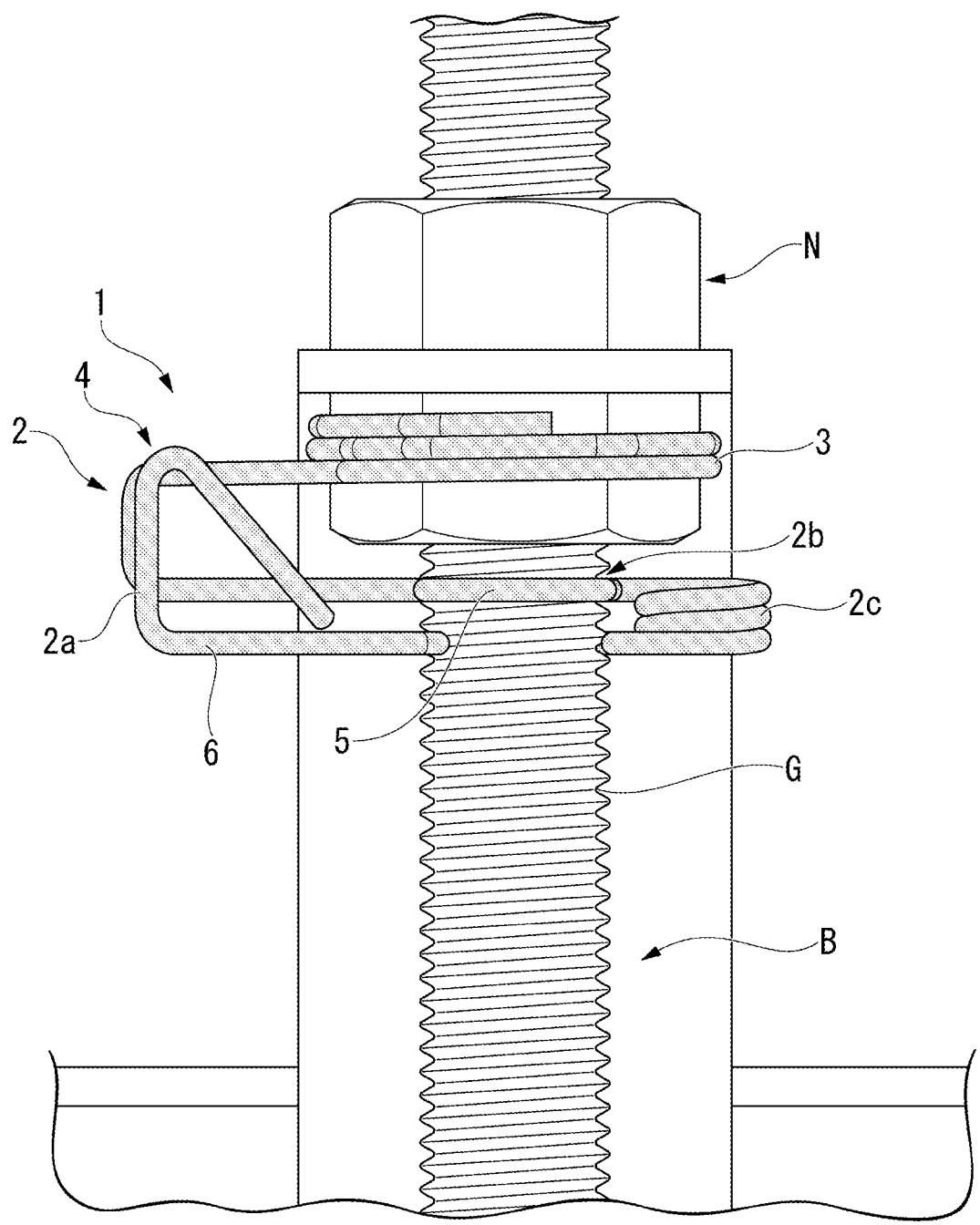
FIG. 4 is a side view of the fall prevention tool according to the embodiment of the present invention when being attached to the bolt.

In a state of FIG. 1, in the bolt holding part 2b of the fall prevention tool 1, an operator applies the force to the handle part 2a from both sides thereof in a direction of reducing the intersection angle of the convex parts 4, and the curved parts 5 of the bolt holding part 2b are overlapped with each other in the bolt axis direction. Therefore, the curved parts 5 of the bolt holding part 2b form the annular shape as viewed from the bolt axis direction. In this state, as shown in FIGS. 1 and 4, the operator inserts the fall prevention tool 1 into the bolt B from a side in which the nut holding part 3 of the fall prevention tool 1 is formed. Further, the operator releases the handle part 2a, such that the force (restoring force) is generated in the handle part 2a in a direction of returning to the original. Therefore, the bolt B is in a state in which the force is applied in a direction in which the curved parts 5 of the bolt holding part 2b interpose the bolt B from both sides thereof. Here, in a case in which the operator applies the force to the handle part 2a from both sides of the handle part 2a in the direction of reducing the intersection angle of the convex parts 4 of the fall prevention tool 1 shown in FIG. 1, the intersection angle of the convex parts 4 is reduced, and the fall prevention tool 1 is in a state shown in FIG. 2.

In a case in which such a fall prevention tool 1 is attached to the bolt B, as shown in FIG. 2, the bolt holding part 2b and the nut holding part 3 are coaxially disposed as viewed from the bolt axis direction. In this case, the nut holding part 3 is fixed in a state in which the nut N is urged in a direction in which the nut N is tightened (rotation direction).

In this state, in a case in which a load is applied to the nut holding part 3 in a direction in which the nut N is loosened (rotation direction opposite to the tightening direction) due to vibration or the like, the nut holding part 3 bends in a diameter-expanding direction (loosening direction). In this case, bending restoring force is generated in the nut holding part 3, and the nut holding part 3 returns to an original position, that is, a position in a case in which the fall prevention tool 1 is attached to the nut N. As a result, the nut N is in a state in which the rotation is prevented by the nut holding part 3. Therefore, in the fall prevention tool 1 according to the present embodiment, the nut holding part 3 can prevent the rotation of the nut N to prevent the nut N from falling off.

With the fall prevention tool 1 according to the present embodiment, by preventing the rotation of the nut N by urging force (bending restoring force of the nut holding part 3), it is not necessary to firmly attach the fall prevention tool 1 to the bolt B, and the large force is not further applied to the bolt B. Therefore, for example, even in a case in which the nut N is detached from the bolt B during maintenance or dismantling, the fall prevention tool 1 can be easily detached. The fall prevention tool 1 is not destroyed in a case of detachment, and thus the fall prevention tool 1 can be reused.

Further, with the fall prevention tool 1 according to the present embodiment, a size of the inner diameter of the bolt holding part 2b can be changed by using the handle part 2a. As a result, in a case in which the fall prevention tool 1 is attached to the bolt B, for example, it is not necessary to move the fall prevention tool 1 to a position in which the nut N is provided by rotating the fall prevention tool 1 along the thread groove G from the bolt axis direction. That is, by bending the inner diameter of the bolt holding part 2b to be larger than an outer diameter of the bolt, the fall prevention tool 1 can be directly attached to the position in which the nut N is provided. Therefore, the fall prevention tool 1 can be easily attached.

Further, with the fall prevention tool 1 according to the present embodiment, the nut holding part 3 has the hexagonal shape that is the same as an outer shape of the nut N. As a result, in a case in which the nut holding part 3 is attached to the nut N, the nut holding part 3 does not come off from the nut N and can reliably hold the nut N. Therefore, the fall prevention tool 1 can reliably prevent the nut N from falling off.

Further, with the fall prevention tool 1 according to the present embodiment, the movable part 2 and the nut holding part 3 are formed by processing a single metal wire 6. Therefore, the formation is easy and the force is easily transmitted to each part.

Further, according to the present embodiment, the handle part 2a protrudes outward with respect to the nut holding part 3 in the radial direction. As a result, the operator can easily grip the handle part 2a, and the fall prevention tool 1 can be easily attached.

Although the preferred embodiment of the present invention has been described so far with reference to the drawings, the present invention is not limited to the embodiment described above. The shapes, combinations, or the like of the constituent members shown in the embodiment described above are merely examples, and various modifications can be made based on design requirements and the like without departing from the scope of the present invention as defined in the claims.

In the embodiment described above, the shape of the nut holding part 3 is the hexagonal shape, but the present invention is not limited to this. The nut holding part 3 can have various shapes (polygonal shape) in accordance with the outer shape of the nut N. Further, for example, in a case in which the nut holding part 3 has a quadrangular shape, even in the case in which the nut N has the hexagonal shape, the nut N can be held in the same manner as in the case in which the nut holding part 3 has the hexagonal shape.

Further, in the embodiment described above, in the fall prevention tool 1, the handle part 2a is formed, but the present invention is not limited to this. For example, in a case in which the handle part 2*a* is not provided and the size of the inner diameter of the bolt holding part 2*b* cannot be changed, the fall prevention tool 1 may be attached to the nut N by moving the fall prevention tool 1 to the position in which the nut N is provided by rotating the fall prevention tool 1 along the thread groove G of the bolt B.

Further, in the embodiment described above, in the fall prevention tool 1, the handle part 2*a* protrudes outward with respect to the nut holding part 3 in the radial direction, but the present invention is not limited to this. The handle part 2*a* may be formed inside the nut holding part 3 in the radial direction. In this case, the fall prevention tool 1 does not greatly protrude outward with respect to the nut N in the radial direction, and does not hinder the surrounding structures of the nut N and the bolt B.

INDUSTRIAL APPLICABILITY

With the fall prevention tool according to the embodiment of the present invention, the fall prevention tool can be detached from the bolt without being destroyed, and the fall prevention tool can be easily detached from the bolt.

REFERENCE SIGNS LIST

1: Fall prevention tool
2: Movable part
2*a*: Handle part
2*b*: Bolt holding part
2*c*: Winding part
3: Nut holding part

The invention claimed is:

1. A fall prevention tool for a nut, which is installed in a bolt to which the nut is attached, the tool comprising:
    a bolt holding part into which the bolt is inserted; and
    a nut holding part that is provided integrally with the bolt holding part, is provided on an outer periphery of the nut, and is configured to prevent rotation of the nut by restoring force by a winding part,
    wherein the winding part is a coil spring shaped part, and
    wherein the winding part generates force in a direction in which the bolt is interposed by the bolt holding part, and also generates force urging the nut in a tightening direction in which the nut is tightened by the nut holding part.

2. The fall prevention tool according to claim 1, further comprising:
    a handle part that is connected to the bolt holding part and is configured to change a diameter of the bolt holding part.

3. The fall prevention tool according to claim 2,
    wherein the handle part protrudes outward with respect to the nut holding part in a radial direction of the bolt.

4. The fall prevention tool according to claim 3,
    wherein the bolt holding part, the winding part and the nut holding part are formed by a single metal wire.

5. The fall prevention tool according to claim 4,
    wherein the nut holding part comes into contact with an outer peripheral surface of the nut and has a polygonal shape.

6. The fall prevention tool according to claim 2,
    wherein the bolt holding part, the winding part and the nut holding part are formed by a single metal wire.

7. The fall prevention tool according to claim 6,
    wherein the nut holding part comes into contact with an outer peripheral surface of the nut and has a polygonal shape.

8. The fall prevention tool according to claim 2,
    wherein the nut holding part comes into contact with an outer peripheral surface of the nut and has a polygonal shape.

9. The fall prevention tool according to claim 3,
    wherein the nut holding part comes into contact with an outer peripheral surface of the nut and has a polygonal shape.

10. The fall prevention tool according to claim 1,
    wherein the bolt holding part, the winding part and the nut holding part are formed by a single metal wire.

11. The fall prevention tool according to claim 10,
    wherein the nut holding part comes into contact with an outer peripheral surface of the nut and has a polygonal shape.

12. The fall prevention tool according to claim 1,
    wherein the nut holding part comes into contact with an outer peripheral surface of the nut and has a polygonal shape.

* * * * *